(12) United States Patent
Ishii et al.

(10) Patent No.: US 7,980,993 B2
(45) Date of Patent: Jul. 19, 2011

(54) VEHICLE CONTROLLER AND VEHICLE CONTROL METHOD

(75) Inventors: Hiroyuki Ishii, Toyota (JP); Fuminori Monji, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 736 days.

(21) Appl. No.: 11/954,665

(22) Filed: Dec. 12, 2007

(65) Prior Publication Data

US 2008/0153667 A1 Jun. 26, 2008

(30) Foreign Application Priority Data

Dec. 22, 2006 (JP) ................................. 2006-346641

(51) Int. Cl.
*B60W 10/04* (2006.01)
(52) U.S. Cl. ........................................ 477/109; 477/115
(58) Field of Classification Search .................. 477/107, 477/109, 115, 116, 143
See application file for complete search history.

(56) References Cited

U.S. PATENT DOCUMENTS

| | | | |
|---|---|---|---|
| 6,186,923 B1 * | 2/2001 | Popp et al. ..................... | 477/115 |
| 7,294,092 B2 * | 11/2007 | Walker et al. .................. | 477/107 |
| 7,510,504 B2 * | 3/2009 | Cullen et al. ................... | 477/107 |
| 7,635,316 B2 * | 12/2009 | Nakajima et al. .............. | 477/107 |
| 2002/0035014 A1 * | 3/2002 | Saito .............................. | 477/143 |
| 2005/0054480 A1 * | 3/2005 | Ortmann et al. ................. | 477/6 |
| 2005/0239597 A1 * | 10/2005 | Shimada ........................ | 477/107 |
| 2006/0003867 A1 * | 1/2006 | Inagaki et al. ................. | 477/113 |
| 2007/0117677 A1 * | 5/2007 | Ayabe et al. .................... | 477/115 |

FOREIGN PATENT DOCUMENTS

| | | | |
|---|---|---|---|
| GB | 2463020 A | * | 3/2010 |
| JP | 6-117527 A | | 4/1994 |
| JP | 2000-205394 A | | 7/2000 |
| JP | 2004-116760 A | | 4/2004 |

* cited by examiner

*Primary Examiner* — Roger Pang
(74) *Attorney, Agent, or Firm* — Sughrue Mion, PLLC

(57) ABSTRACT

When a release of an accelerator is detected during a shift of an automatic transmission, instead of discharging the hydraulic pressure for engagement of an engaging device of the automatic transmission immediately after the release of the accelerator is detected during a shift, the hydraulic pressure for engagement of the engaging device of the automatic transmission is gently reduced with a remaining engine torque taken into consideration, the remaining engine torque being caused by the retardation of the decrease in the throttle opening degree. In this way, the torque capacity sufficient for the remaining torque caused by the throttle opening degree control performed when the release of the accelerator is detected during the shift is kept so that a slip in the engaging device of the automatic transmission is reduced.

9 Claims, 7 Drawing Sheets

FIG.2

|     | C1 | C2 | C3 | C4 | B1 | B2 | B3 | B4 | F0 | F1 | F2 | F3 |
|-----|----|----|----|----|----|----|----|----|----|----|----|----|
| P   |    |    |    |    |    |    |    |    |    |    |    |    |
| R   |    |    | ○  |    | ◎  |    |    | ○  |    | ○  |    |    |
| N   |    |    |    |    |    |    |    |    |    |    |    |    |
| 1st | ○  |    |    | ◎  |    |    |    | ◎  | ○  |    |    | ○  |
| 2nd | ○  |    |    | ◎  |    | ◎  | ○  |    | ○  | ○  | ○  |    |
| 3rd | ○  |    | ○  | ◎  | ◎  |    | △  |    | ○  | ○  |    |    |
| 4th | ○  | ○  | △  | ◎  |    |    | △  |    | ○  |    |    |    |
| 5th | △  | ○  | ○  |    | ○  |    | △  |    |    |    |    |    |
| 6th | △  | ○  |    |    | △  | ○  | △  |    |    |    |    |    |

○ ENGAGED    ◎ ENGAGED AT THE TIME OF ENGINE BRAKING    △ ENGAGED BUT NOT INVOLVED IN TRANSMITTING POWER

VEHICLE CONTROLLER AND VEHICLE CONTROL METHOD

INCORPORATION BY REFERENCE

The disclosure of Japanese Patent Application No. 2006-346641 filed on Dec. 22, 2006, including the specification, drawings and abstract is incorporated herein by reference in its entirety.

BACKGROUND OF THE INVENTION

1. Field of the Invention

The invention relates to a controller for and a method of controlling a vehicle equipped with an internal combustion engine (hereinafter also referred to as "the engine") and an automatic transmission connected to the engine, and more specifically, to a controller for and a method of controlling a vehicle in which the degree of opening of a throttle of the engine and the pressure of hydraulic fluid in the automatic transmission are controlled.

2. Description of the Related Art

In the field of engines mounted on vehicles, an electronic throttle system is available, in which an actuator for driving a throttle valve provided in each intake passage, which makes it possible to control the degree of opening of a throttle independently of the operation of the accelerator pedal by a driver. In the electronic throttle system, the throttle opening degree is controlled so that the optimal air intake amount (desired air intake amount) according to the operational conditions of the engine, such as the engine speed and the amount of depression of the accelerator pedal by a driver (accelerator pedal operation amount), is obtained. In such an electronic throttle system, the actual opening degree of the throttle valves is detected using the throttle opening degree sensors or the like, and the actuators for the throttle valves are feedback-controlled so that the actual throttle opening degree becomes equal to the throttle opening degree (desired throttle opening degree) at which the desired air intake amount is achieved.

Meanwhile, as a transmission for appropriately transmitting the torque and the rotation produced by an engine to the driving wheels depending on the drive conditions of a vehicle in the vehicle equipped with the engine, an automatic transmission is available, in which the speed ratio between the engine and the driving wheels is automatically and optimally set.

As automatic transmissions that are mounted on vehicles, a planetary gear-type transmission, in which a gear is set using clutches, brakes and a planetary gear(s), and a belt-type continuously variable transmission (CVT), in which the speed ratio is steplessly adjusted, are available.

In a vehicle equipped with a planetary gear-type automatic transmission, a shift map including the shift curves (gear change lines) used for establishing the optimal gear depending on the vehicle speed and the accelerator pedal operation amount is stored in an electronic control unit (ECU) or the like. In accordance with the shift map, the desired gear is calculated based on the vehicle speed and the accelerator pedal operation amount with reference to the shift map, and, based on the desired gear, the gear (speed) is automatically set by engaging or releasing each of clutches, brakes, and one-way clutches, which are frictionally engaging devices, into a predetermined state.

In general, a vehicle equipped with an automatic transmission is provided with a shift lever operated by a driver. The shift position of the automatic transmission is changed between the P position (parking position), the R position (reversing position), the N position (neutral position), the D position (drive position), etc. by operating the shift lever.

As a method of controlling such an automatic transmission, a technique for controlling the pressure of the hydraulic fluid in the automatic transmission based on the throttle opening degree of the engine is available. However, in the case where the hydraulic fluid pressure during a shift is controlled based on the throttle opening degree, if, in spite of the fact that the accelerator pedal operation amount is constant, the throttle opening degree varies due to the variation in the engine speed, for example, the hydraulic fluid pressure in the automatic transmission is varied, and the shift characteristics are also varied, which can cause a shift shock at the time of a shift.

As a method of suppressing such a shift shock, a method is available, in which the hydraulic fluid pressure in the automatic transmission is controlled according to the accelerator pedal operation amount when the automatic transmission is being shifted (see Japanese Patent Application Publication No. 2004-116760 (JP-A-2004-116760), for example). In addition, in such a control method, control for discharging (releasing) the hydraulic pressure in an engaging device of the automatic transmission is also performed when a release of the accelerator pedal is detected during a shift of the automatic transmission.

Meanwhile, in a process of controlling a vehicle equipped with an engine and an automatic transmission, control in which the throttle opening degree (the degree of opening of electronically-controlled throttle valves) is gradually reduced to gentle variation in the engine torque, which is sometimes called a dashpot control, is performed. Although it is possible to avoid a rapid variation in the engine torque by gradually reducing the throttle opening degree after a release of the accelerator pedal is detected during a shift, a certain amount of engine torque remains after the release of the accelerator pedal is detected, which can cause a shift shock. This will be described below.

In this kind of automatic transmission, as described above, when a release of the accelerator pedal is detected during a shift, in consideration of the ride quality and the like, instead of immediately changing the throttle opening degree to the degree corresponding to the fully closed state, which is a fully closed state in terms of throttle opening degree control, the throttle opening degree is gradually reduced to cause the engine torque to be gently reduced.

However, with regard to the hydraulic pressure for engagement of an engaging device of the automatic transmission, in the case of the conventional control method, the hydraulic pressure for engagement is discharged immediately after a release of the accelerator pedal is detected during a shift (see the hydraulic pressure command value shown in FIG. 7), which can cause a slip in the engaging device, such as the brake and the clutch, of the automatic transmission, which can in turn cause a shift shock. Specifically, although it is possible to avoid a rapid variation in the engine torque by gradually reducing the throttle opening degree after a release of the accelerator pedal is detected during a shift of the automatic transmission, a certain amount of engine torque remains after the release of the accelerator pedal. When the hydraulic pressure for engagement of an engaging device of the automatic transmission is discharged under conditions where a certain amount of engine toque remains as described above, the torque capacity of the engaging device (torque transmitted by the engagement) sufficient for the remaining engine torque is not kept in some cases. This can cause a slip in the engaging device, which can in turn cause a shift shock.

SUMMARY OF THE INVENTION

An object of the invention is to suppress the shift shock that can occur when a release of an accelerator is detected during a shift of an automatic transmission, in a controller for and a method of controlling a vehicle in which the degree of opening of a throttle of an internal combustion engine and the pressure of hydraulic fluid in the automatic transmission are controlled.

A first aspect of the invention is a vehicle controller including: a throttle opening degree control unit that retards decrease in the degree of opening of a throttle when a release of an accelerator is detected during a shift of an automatic transmission; and a hydraulic pressure control unit that retards decrease in pressure of hydraulic fluid in the automatic transmission in parallel with the retardation of the decrease in the throttle opening degree when the release of the accelerator is detected during the shift. The throttle opening degree control unit retards decrease in the throttle opening degree when a release of an accelerator is detected during a shift of the automatic transmission. The hydraulic pressure control unit retards decrease in the hydraulic fluid pressure in the automatic transmission in parallel with the retardation of the decrease in the throttle opening degree when the release of the accelerator is detected during the shift.

According to the above controller, when a release of the accelerator is detected during a shift of the automatic transmission, instead of discharging pressure of the hydraulic fluid in the automatic transmission (the hydraulic pressure for engagement of an engaging device, for example) immediately after the release of the accelerator is detected during the shift, the decrease in the hydraulic fluid pressure is retarded to keep the torque capacity in the automatic transmission (the torque capacity of the engaging device, for example). Thus, even when a certain amount of engine torque remains due to the throttle opening degree control (the control for retarding decrease in the throttle opening degree) performed when a release of the accelerator is detected during a shift, it is possible to reduce the slip in the engaging device of the automatic transmission, and it is therefore possible suppress the occurrence of a shift shock.

Embodiments include a controller in which, when the release of the accelerator is detected during the shift of the automatic transmission, the hydraulic pressure control unit causes the hydraulic fluid pressure in the automatic transmission to be gently reduced with a remaining engine torque taken into consideration, the remaining engine torque being caused by the retardation of the decrease in the throttle opening degree. The hydraulic fluid pressure in the automatic transmission at the time of the release of the accelerator is set with a remaining engine torque taken into consideration, the remaining engine torque being caused by the throttle opening degree control performed when the release of the accelerator is detected during a shift, which makes it possible to keep the torque capacity sufficient for the remaining torque. Thus, it is possible to more effectively suppress a shift shock.

Embodiments of the invention include a controller in which the automatic transmission mounted on the vehicle is a multi-step automatic transmission having a planetary gear speed reduction mechanism, and establishes a plurality of gear ratios by engaging or releasing an engaging device into a predetermined state, and, when the release of the accelerator is detected during the shift of the automatic transmission, the hydraulic pressure control unit causes the hydraulic pressure for engagement of the engaging device of the automatic transmission to be gently reduced with a remaining engine torque taken into consideration, the remaining engine torque being caused by the retardation of the decrease in the throttle opening degree.

According to the invention, in a controller for a vehicle that is equipped with an internal combustion engine and an automatic transmission connected to the internal combustion engine, and in which the degree of opening of a throttle of the internal combustion engine and the pressure of hydraulic fluid in the automatic transmission are controlled, the torque capacity in the automatic transmission (the torque capacity of the engaging device) is kept by retarding decrease in the hydraulic fluid pressure. Thus, it is possible to suppress the occurrence of a shift shock.

A second aspect of the invention is a vehicle control method including the steps of: determining whether a release of an accelerator is detected during a shift of an automatic transmission; retarding decrease in the degree of opening of a throttle when it is determined that the release of the accelerator is detected during the shift; and retarding decrease in pressure of hydraulic fluid in the automatic transmission in parallel with the retardation of the decrease in the throttle opening degree when the release of the accelerator is detected during the shift.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 2 shows an operation table of an automatic transmission shown in FIG. 1;

DETAILED DESCRIPTION OF EMBODIMENTS

A power train for a vehicle including a controller of an embodiment of the invention will be described. The vehicle controller of this embodiment is realized by a program executed by an electronic control unit (ECU) 100 shown in FIG. 1.

Figure 1:
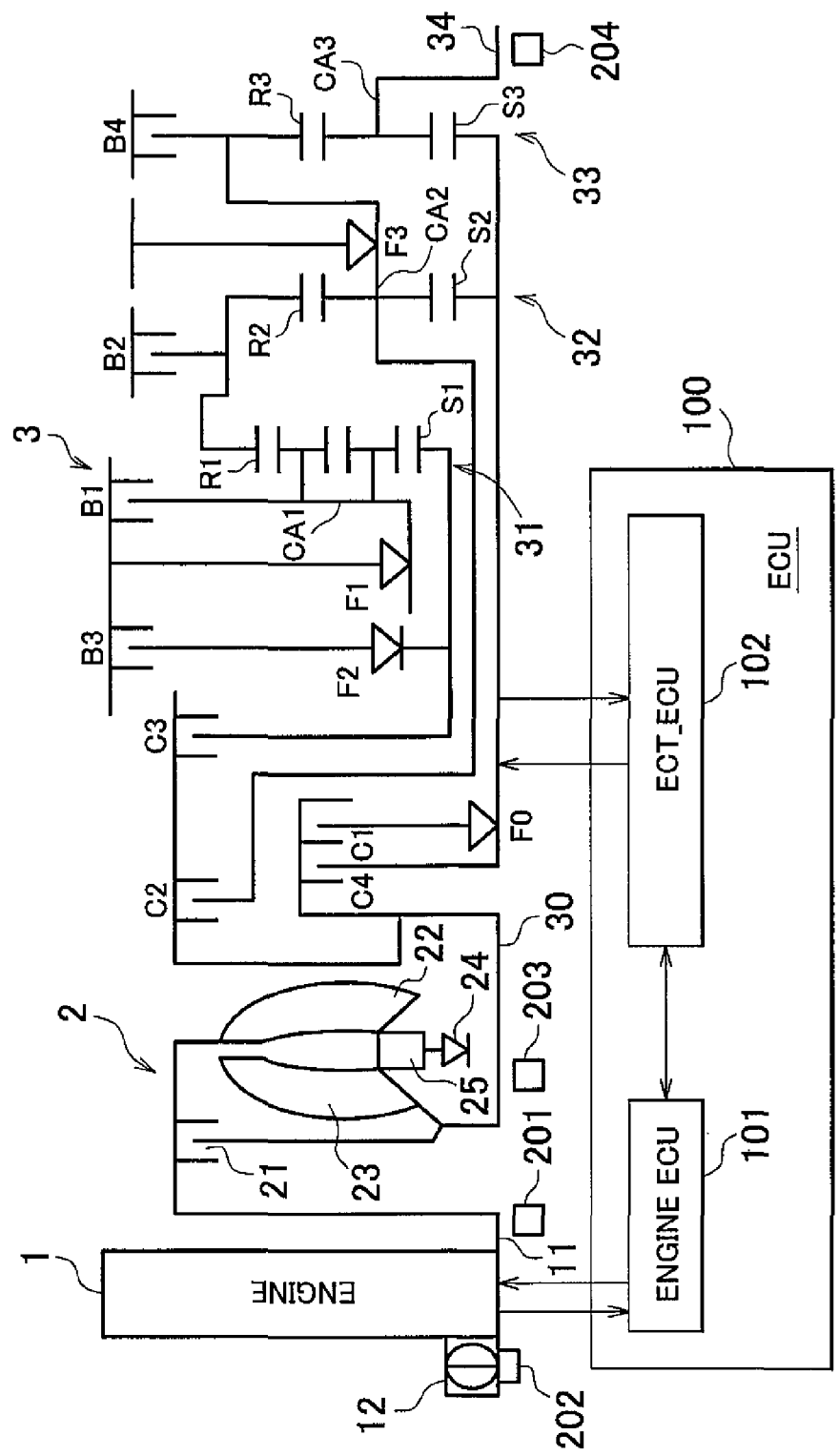
FIG. 1 is a schematic configuration diagram showing an embodiment of a vehicle controller of the invention.

As shown in FIG. 1, the vehicle power train includes an engine 1, a torque converter 2, an automatic transmission 3, and the ECU 100. Each of the engine 1, the torque converter 2, the automatic transmission 3, and the ECU 100 will be described below.

Figure 3:
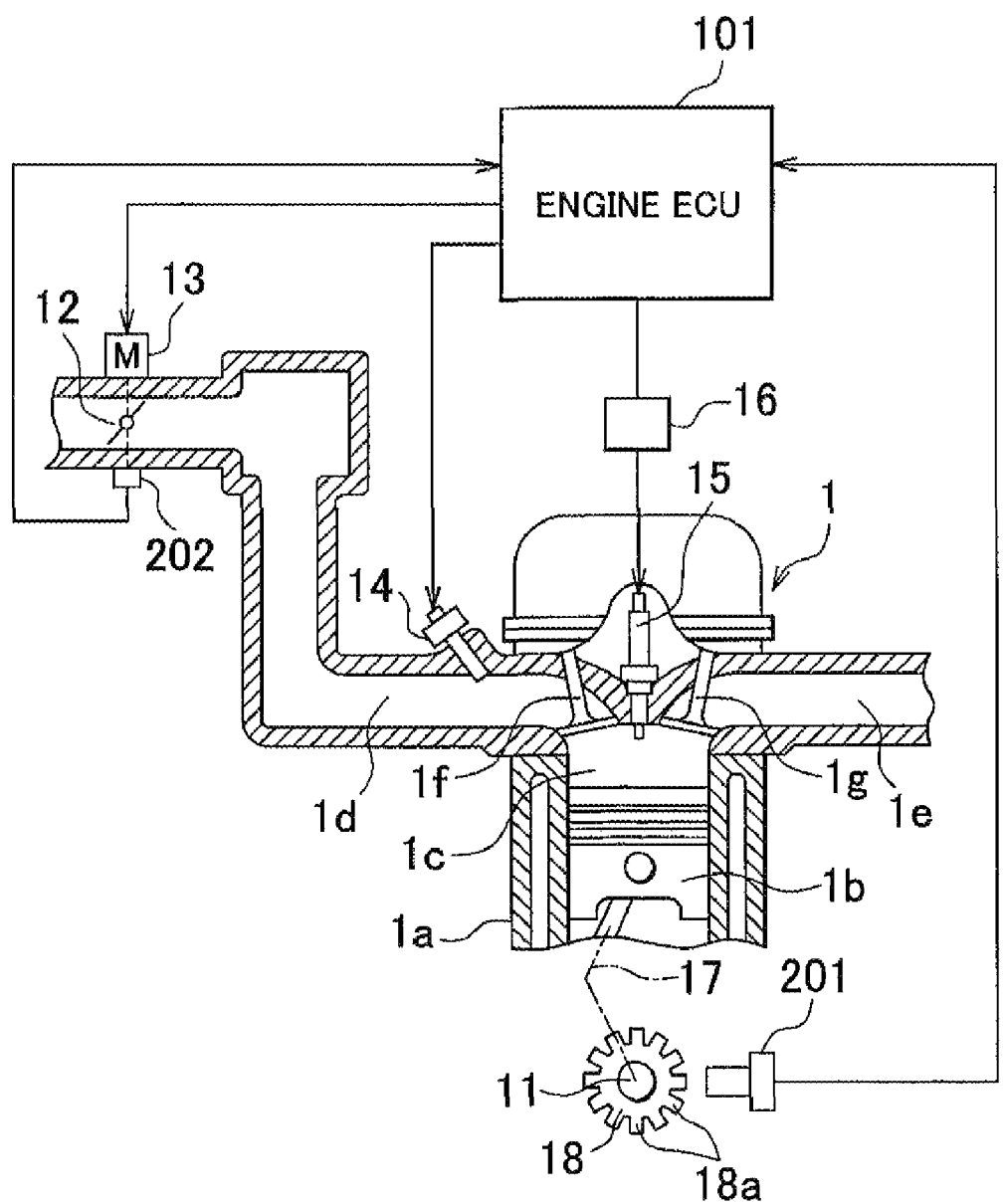
FIG. 3 is a schematic configuration diagram of an engine shown in FIG. 1.

The engine 1 is a four-cylinder gasoline engine, for example, in which pistons 1b that vertically reciprocate are provided in a cylinder block 1a including the cylinders as shown in FIG. 3. The pistons 1b are connected to a crankshaft 11 through connecting rods 17. The reciprocation of the pistons 1b is converted into rotation of the crankshaft 11. The crankshaft 11 is connected to the input shaft of the torque converter 2.

The rotational speed of the crankshaft 11 (the engine speed NE) is detected by an engine speed sensor 201. The engine speed sensor 201 is an electromagnetic pick-up, for example, which generates a pulse-like signal (output pulses) corresponding to protrusions 18a of a signal rotor 18 when the crankshaft 11 rotates.

A spark plug 15 is disposed in each combustion chamber 1c of the engine 1. The timing of ignition in the spark plugs 15 is adjusted by an igniter 16. The igniter 16 is controlled by an engine ECU 101.

An intake passage 1d and an exhaust passage 1e are connected to the combustion chamber 1c of the engine 1. An intake valve 1f is provided between the intake passage 1d and the combustion chamber 1c. The connection between the intake passage 1d and the combustion chamber 1c is brought about and cut off by driving the intake valve 1f to open and close, respectively. An exhaust valve 1g is provided between the exhaust passage 1e and the combustion chamber 1c. The connection between the exhaust passage 1e and the combustion chamber 1c is brought about and cut off by driving the exhaust valve 1g to open and close, respectively. Driving the intake and exhaust valves 1f and 1g to open and close is performed by the rotation of an intake camshaft and an exhaust camshaft, respectively, to which the rotation of the crankshaft 11 is transmitted.

In the intake passage 1d, an electronically-controlled throttle valve 12 for regulating the amount of air taken into the engine 1 is disposed. The throttle valve 12 is driven by a throttle motor 13. With the throttle valve 12, it is possible to electronically control the throttle opening degree independently of the accelerator pedal operation performed by a driver. The opening degree (the throttle opening degree) is detected by a throttle opening degree sensor 202. The drive of the throttle motor 13 is controlled by the engine ECU 101.

Specifically, the opening degree of the throttle valve 12 is controlled so that the optimal air intake amount (desired air intake amount) according to the operational conditions of the engine 1, such as the engine speed NE detected by the engine speed sensor 201 and the amount of depression of the accelerator pedal by a driver (accelerator pedal operation amount), is obtained. More specifically, the actual opening degree of the throttle valve 12 is detected using the throttle opening degree sensor 202. The throttle motor 13 for the throttle valve 12 is feedback-controlled so that the actual throttle opening degree becomes equal to the throttle opening degree (desired throttle opening degree) at which the desired air intake amount is achieved.

An injector (fuel injection valve) 14 for injecting fuel is provided on the intake passage 1d. Fuel pressurized to a predetermined pressure is supplied to the injector 14 from a fuel tank via a fuel pump, and the fuel is injected into the intake passage 1d. The injected fuel is mixed with the intake air into a mixture, and is introduced into the combustion chamber 1c of the engine 1. The mixture introduced into the combustion chamber 1c is ignited by the spark plug 15, thereby burning, or exploding. The burning, or exploding, of the mixture in the combustion chamber 1c causes the piston 1b to reciprocate, which in turn causes the crankshaft 11 to rotate. The above-described operational conditions of the engine 1 are controlled by the engine ECU 101.

As shown in FIG. 1, the torque converter 2 includes: a lock-up clutch 21 that establishes a direct connection between the input shaft and the output shaft; an input shaft-side pump impeller 22; an output shaft-side turbine impeller 23; a one-way clutch 24; and a stator 25 that brings about the torque amplification effect. The torque converter 2 and the automatic transmission 3 are connected through a rotary shaft. The output shaft rotational speed NT (hereinafter referred to as "the turbine speed NT") of the torque converter 2 is detected by a turbine speed sensor 203.

As shown in FIG. 1, the automatic transmission 3 is a planetary gear-type transmission, which includes a double pinion-type, first planetary gear 31, a single pinion-type, second planetary gear 32, and a single pinion-type, third planetary gear 33.

A sun gear S1 of the first planetary gear 31 is selectively connected to an input shaft 30 through a clutch C3. The sun gear S1 is selectively connected to a housing through a one-way clutch F2 and a brake B3 so that the rotation in the counter direction (the direction counter to the direction of rotation of the input shaft 30) of the sun gear S1 is prevented. A carrier CA1 of the first planetary gear 31 is selectively connected to the housing through a brake B1. The counter rotation of the carrier CA1 is always prevented by a one-way clutch F1, which is provided in parallel with the brake B1. A ring gear R1 of the first planetary gear 31 is integrally connected to a ring gear R2 of the second planetary gear 32, and is selectively connected to the housing through a brake B2.

A sun gear S2 of the second planetary gear 32 is integrally connected to a sun gear S3 of the third planetary gear 33, and is selectively connected to the input shaft 30 through a clutch C4. In addition, the sun gear S2 is selectively connected to the input shaft 30 through a one-way clutch F0 and a clutch C1 so that the counter rotation of the sun gear S2 relative to the input shaft 30 is prevented. A carrier CA2 of the second planetary gear 32 is integrally connected to a ring gear R3 of the third planetary gear 33. The carrier CA2 is selectively connected to the input shaft 30 through a clutch C2, and is selectively connected to the housing through a brake B4. The counter rotation of the carrier CA2 is always prevented by a one-way clutch F3, which is provided in parallel with the brake B4. A carrier CA3 of the third planetary gear 33 is integrally connected to an output shaft 34. The rotational speed Nout of the output shaft 34 is detected by an output shaft rotational speed sensor 204.

In the above-described automatic transmission 3, the gear (speed) of the automatic transmission 3 is set by engaging or releasing each of the clutches C1 to C4, the brakes B1 to B4, and the one-way clutches F0 to F3, which are frictionally engaging devices, into a predetermined state.

The automatic transmission 3 is provided with a shift lever operated by a driver. The shift between the P position (parking position), the R position (reversing position), the N position (neutral position), the D position (drive position), etc. is performed by operating the shift lever.

The engagement and release of the clutches C1 to C4, the brakes B1 to B4, and the one-way clutches F0 to F3 of the automatic transmission 3 are shown in the operation table of FIG. 2. As shown in FIG. 2, while the first gear used when the vehicle starts is established, for example, the clutch C1 and the one-way clutches F0 and F3 are engaged. Among the clutches, the clutch C1 is called a forward clutch (input clutch). As shown in the operation table of FIG. 2, the forward clutch C1 is used in an engaged state whenever a gear ratio to allow the vehicle to move forward, that is, other than those of the P position, the R position, and the N position, is established.

The ECU 100 for controlling the above-described power train includes: the engine ECU 101 for controlling the engine 1; and an electronically controlled automatic transmission_ECU (ECT-ECU) 102 for controlling the torque converter 2 and the automatic transmission 3.

Figure 4:
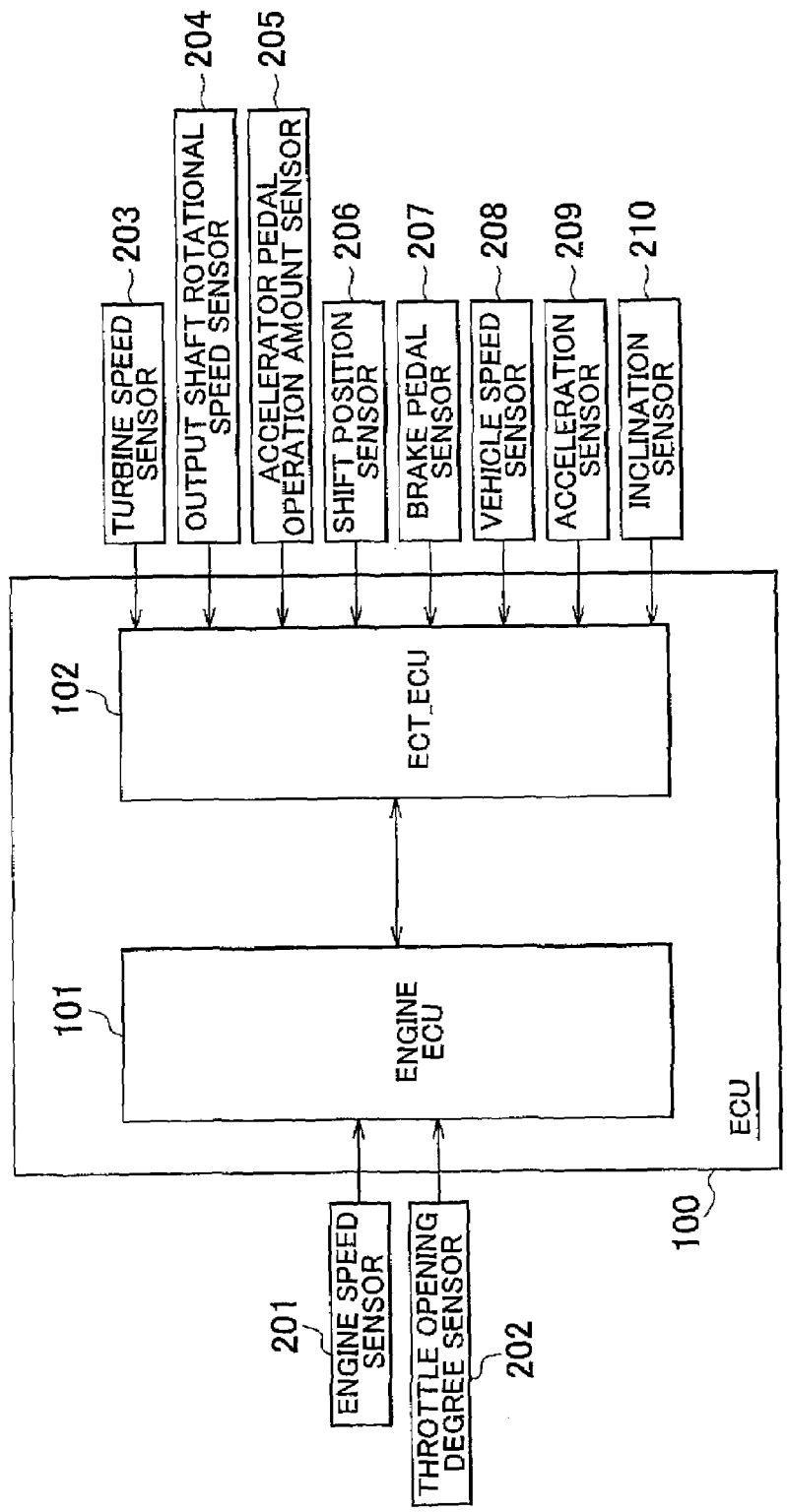
FIG. 4 is a block diagram showing a configuration of a control system including an ECU.

As shown in FIG. 4, connected to the engine ECU 101 are the sensors for determining the operational conditions of the engine 1, such as the engine speed sensor 201 and the throttle opening degree sensor 202. The engine ECU 101 receives signals from these sensors.

As shown in FIG. 4, connected to the ECT_ECU 102 are: the turbine speed sensor 203; the output shaft rotational speed sensor 204; an accelerator pedal operation amount sensor 205 for detecting the amount of operation of the accelerator pedal; a shift position sensor 206 for detecting the shift position of the automatic transmission 3; a brake pedal sensor 207; a vehicle speed sensor 208 for detecting a speed of the vehicle; an acceleration sensor 209 for detecting an acceleration G of the vehicle; and an inclination sensor 210 for detecting an inclination of the vehicle. The ECT_ECU 102 receives signals from these sensors.

The ECT_ECU 102 supplies a lock-up clutch control signal to the torque converter 2. The engagement pressure of the lock-up clutch 21 is controlled based on the lock-up clutch control signal. In addition, the ECT_ECU 102 supplies solenoid control signals (hydraulic pressure command signals) to the automatic transmission 3. Linear solenoid valves and on/off solenoid valves in the hydraulic circuit of the automatic transmission 3 are controlled based on the solenoid control signals so that each of the clutches C1 to C4, the brakes B1 to B4, and the one-way clutches F0 to F3 is engaged or released into a predetermined state to establish a certain gear (first to sixth gear).

The engine ECU 101 sends the ECT_ECU 102 the signals, such as a signal indicating the accelerator pedal operation amount detected by the accelerator pedal operation amount sensor 205, and a signal indicating the engine speed NE detected by the engine speed sensor 201. Based on the signals sent from the engine ECU 101 and the output signals from the various sensors described above, the ECT_ECU 102 sends the engine ECU 101 engine control signals, such as a command signal specifying the throttle opening degree. The engine ECU 101 controls the engine 1 based on the engine control signals and other control signals. The ECT_ECU 102 performs the following "control performed when a release of the accelerator pedal is detected during a shift."

Figure 6:
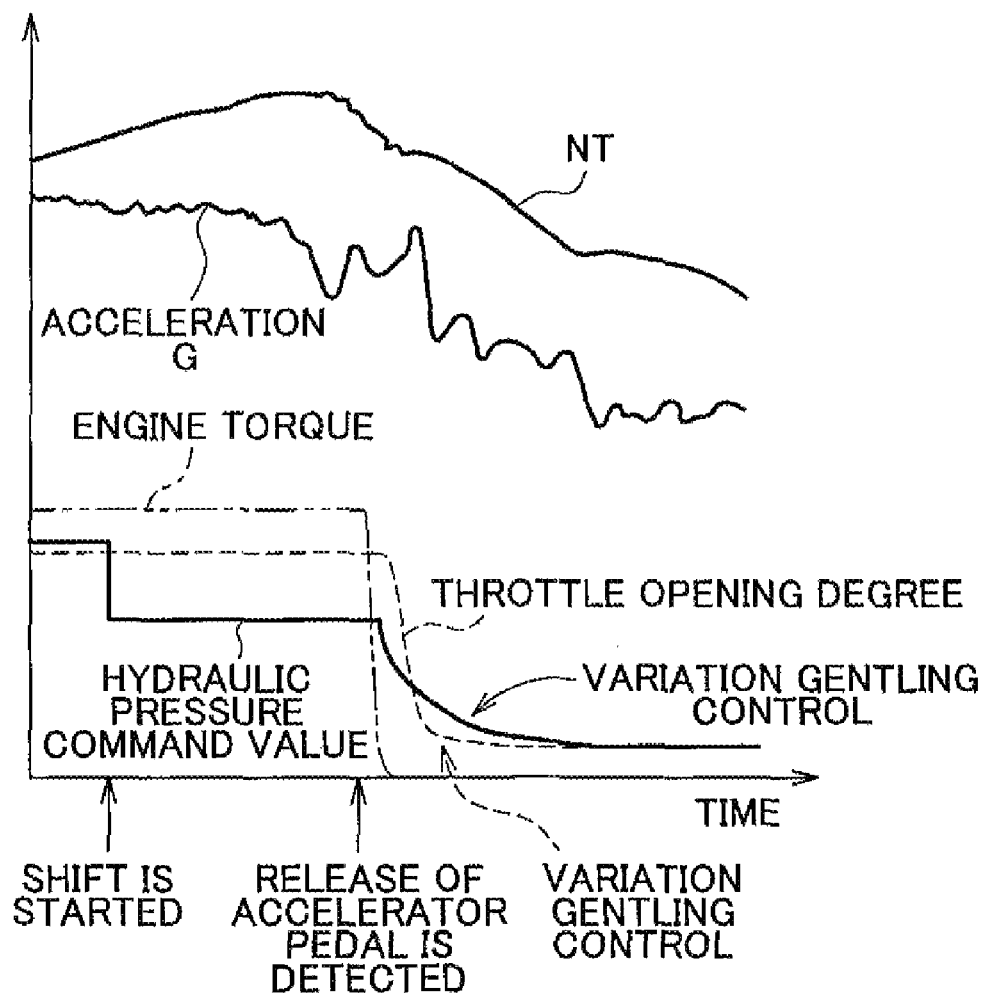
FIG. 6 is a timing chart showing operation of the control performed when the release of the accelerator is detected during the shift.

In this embodiment, as shown in FIG. 6, when a release of the accelerator pedal is detected during a shift of the automatic transmission 3, in consideration of the ride quality, instead of immediately changing the throttle opening degree to the degree corresponding to the fully closed state, which is a fully closed state in terms of throttle opening degree control, the throttle opening degree is gradually reduced to retard the decrease in the engine torque. By contrast, with regard to the hydraulic pressure for engagement of an engaging device of the automatic transmission 3, in the conventional control scheme, the engagement hydraulic pressure is immediately discharged when a release of the accelerator pedal is detected during a shift. For this reason, a slip can occur in the engaging device to cause a shift shock. This will be specifically described below.

As described above, although it is possible to avoid a rapid variation in the engine torque by gradually reducing the throttle opening degree after a release of the accelerator pedal is detected during a shift, a certain amount of engine torque remains after the release of the accelerator pedal is detected. When the hydraulic pressure for engagement of an engaging device of the automatic transmission 3 is discharged under conditions where a certain amount of engine toque remains as described above, the torque capacity sufficient for the remaining engine torque is not kept in some cases, and a slip can therefore occur in the engaging device to cause a shift shock.

Figure 7:
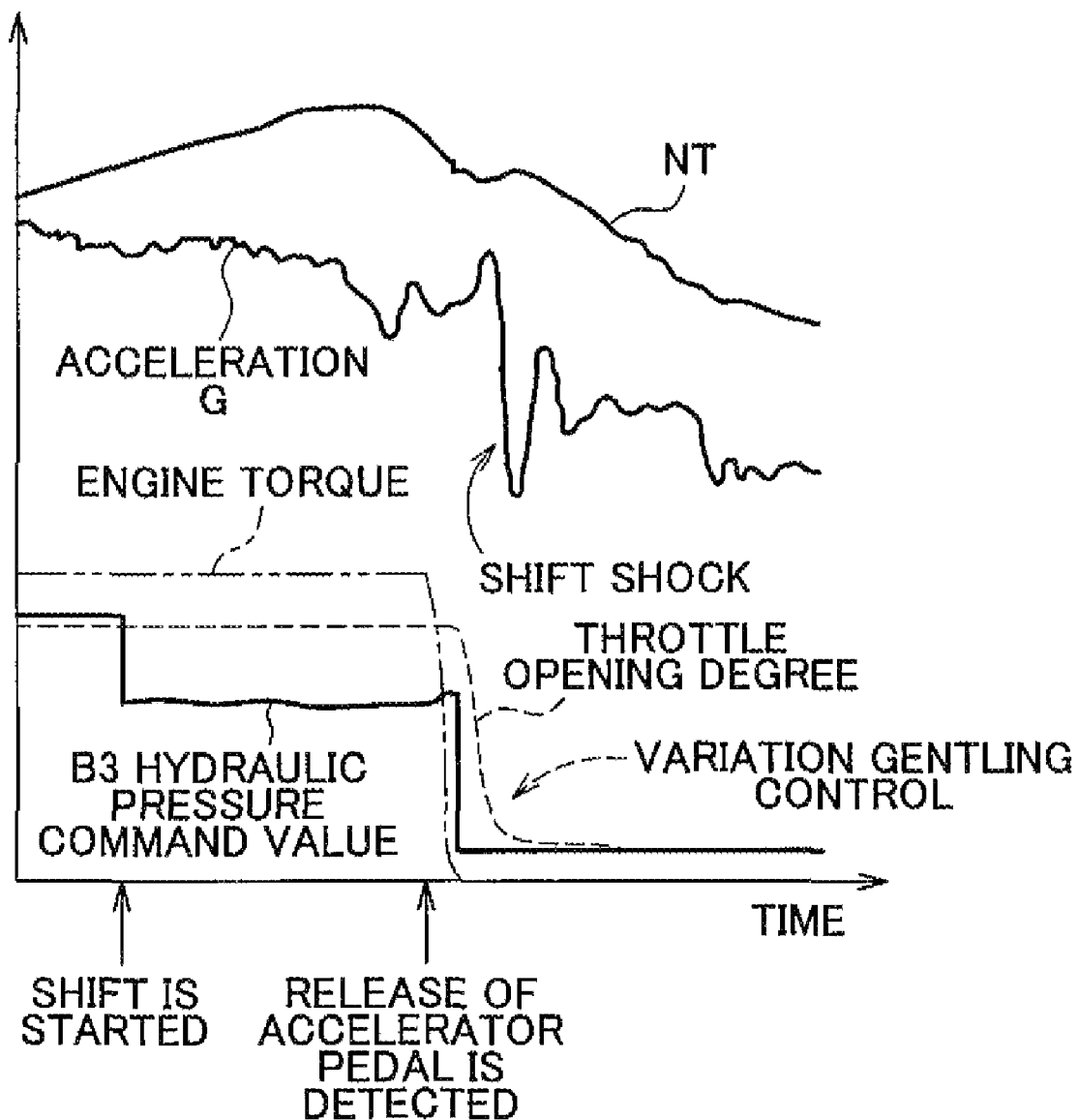
FIG. 7 is a timing chart showing an example of operation of the control in which the hydraulic pressure for engagement is discharged immediately after a release of an accelerator pedal is detected during a shift.

When the engagement hydraulic pressure for the brake B3 (see FIGS. 1 and 2) of the automatic transmission 3 is discharged when a release of the accelerator pedal is detected during a shift from the first gear to the second gear, for example, a situation is brought about in which the control of the hydraulic pressure for the brake B3 is inadequate for the remaining engine torque. In this way, a slip occurs in the brake B3, and the shift shock as shown in FIG. 7 occurs. Also when a release of the accelerator pedal is detected during a shift from the second gear to the third gear, and when a release of the accelerator pedal is detected during a shift from the third gear to the fourth gear, a slip occurs in the clutch C3 or the clutch C2 (see FIGS. 1 and 2) to cause a shift shock. The term "a release of an accelerator" herein means a release of the accelerator enough to cause a shift shock as described above.

This embodiment has been devised to eliminate such a situation, and is characterized in that, when a release of the accelerator pedal is detected during a shift of the automatic transmission 3, in consideration of the remaining engine torque caused by the throttle opening degree control (control for retarding the decrease in the throttle opening degree) performed at the time of the release of the accelerator pedal, the hydraulic pressure for the engaging device (the brake B3, for example) of the automatic transmission 3 is gradually reduced, thereby suppressing the shift shock.

Figure 5:
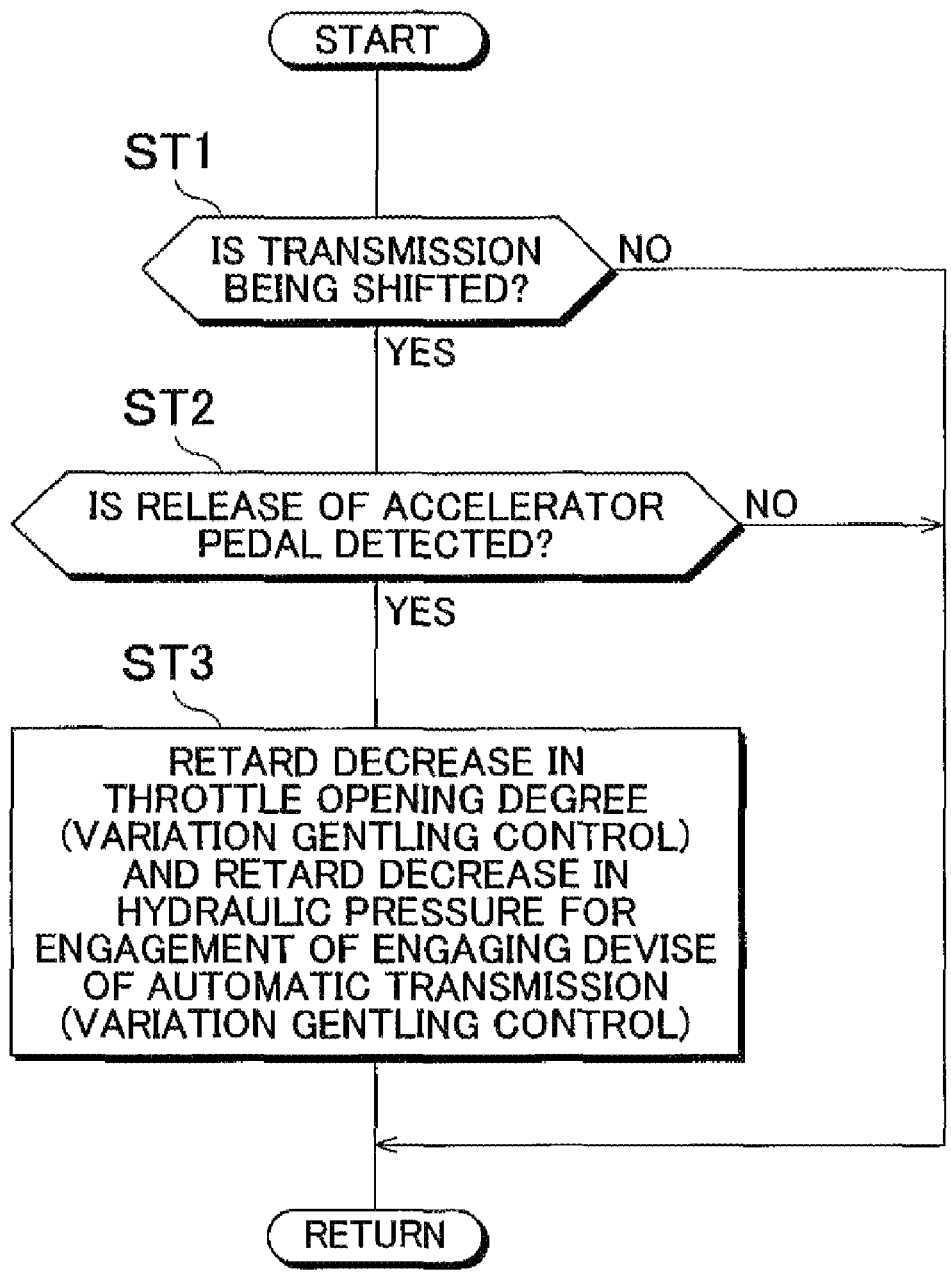
FIG. 5 is a flow chart showing a process of control performed when a release of an accelerator pedal is detected during a shift.

A specific control process, which is performed when a release of the accelerator pedal is detected during a shift, will be described with reference to the flow chart shown in FIG. 5 and the timing chart shown in FIG. 6. The control routine, shown in FIG. 5, which is performed when a release of the accelerator pedal is detected during a shift, is repeatedly executed by the ECT_ECU 102 every predetermined period of time.

In the control routine performed when a release of the accelerator pedal is detected during a shift, the ECT_ECU 102 sends the engine ECU 101 the engine control signals, such as the command signal specifying the throttle opening degree, and the engine ECU 101 controls, for example, the throttle opening degree in the engine 1 according to the engine control signals, such as the command signal specifying the throttle opening degree. The ECT_ECU 102 supplies, to the hydraulic circuit of the automatic transmission 3, a hydraulic pressure command signal for engaging or releasing an engaging device.

In step ST1, it is determined whether the automatic transmission 3 is being shifted, and, when the determination result is negative, the routine is temporarily exited.

When the determination result in step ST1 is affirmative (when the automatic transmission 3 is being shifted), the process proceeds to step ST2. In step ST2, it is determined whether a release of the accelerator pedal is detected, based on the output signal from the accelerator pedal operation amount sensor 205. When the determination result is negative, the routine is temporarily exit. When the result of determination in step ST2 is affirmative, that is, when a release of the accelerator pedal is detected during a shift, the process proceeds to step ST3.

In step ST3, the control of the throttle opening degree and the control of the hydraulic pressure for engagement of an engaging device of the automatic transmission 3, which are performed when a release of the accelerator pedal is detected during a shift, are performed. The control will be specifically described below.

First, with regard to the throttle opening degree, the control is performed in which, instead of immediately changing the throttle opening degree to the degree corresponding to the fully closed state, which is a fully closed state in terms of throttle opening degree control, the decrease in the throttle opening degree is retarded (control for gentling variation in the throttle opening degree) when a release of the accelerator pedal is detected during a shift, as shown in FIG. 6, for example.

When the throttle opening degree is gradually reduced when a release of the accelerator pedal is detected during a shift as described above, it is possible to avoid a rapid variation in the engine torque, and to maintain favorable ride quality of the vehicle. However, when a certain amount of engine torque remains after a release of the accelerator pedal is detected, and the hydraulic pressure for engagement of an engaging device of the automatic transmission 3 is discharged under conditions where a certain amount of engine torque remains, a slip occurs in the engaging device to cause the shift shock (see FIG. 7).

Considering this situation, in this embodiment, the control (variation gentling control) is performed in which, instead of discharging the hydraulic pressure for engagement of an engaging device of the automatic transmission 3 immediately after a release of the accelerator pedal is detected during a shift, the decrease in the hydraulic pressure for engagement of the engaging devices is retarded so as to be able to keep the torque capacity of the engaging device that is sufficient for the remaining engine torque, in consideration of the remaining engine torque that is caused by the throttle opening degree control (throttle opening degree decrease-retarding control) performed when a release of the accelerator pedal is detected during a shift.

Specifically, when a release of the accelerator pedal is detected during a shift from the first gear to the second gear, for example, as shown in FIG. 6, the decrease in the hydraulic pressure for engagement of the brake B3 (see FIGS. 1 and 2) (hydraulic pressure command value) is retarded to cause the brake B3 to be gently released, whereby the slip in the brake B3 that can occur when a release of the accelerator pedal is detected during a shift is reduced. Also when a release of the accelerator pedal is detected during a shift from the second gear to the third gear, and when a release of the accelerator pedal is detected during a shift from the third gear to the fourth gear, for example, the decrease in the hydraulic pressure (hydraulic pressure command value) for engagement of the clutch C3 or the clutch C2 (see FIGS. 1 and 2) is retarded to cause the clutch C3 or C2 to be gently released, whereby the slip in the clutch C3 or C2 that can occur when a release of the accelerator pedal is detected during a shift is reduced.

After the above-described process in step ST3 is completed, that is, after the variation gentling control for the throttle opening degree and the variation gentling control for the hydraulic pressure for engagement of the engaging device, which are performed when a release of the accelerator pedal is detected during a shift, are completed, this routine is temporarily exited.

As described above, according to the vehicle controller of this embodiment, because the hydraulic pressure for engagement of an engaging device (the brake B3, for example) is gradually reduced, instead of discharging the hydraulic pressure for engagement of an engaging device of the automatic transmission 3 immediately after a release of the accelerator pedal is detected during a shift of the automatic transmission 3 (during a shift from the first gear to the second gear, for example), it is made possible to keep an appropriate torque capacity sufficient for the remaining engine torque caused by the throttle opening degree control (throttle opening degree decrease-retarding control) performed when a release of the accelerator pedal is detected during a shift. Thus, it is possible to reduce the slip in the engaging device (the slip in the brake B3, for example) of the automatic transmission 3, and it is therefore possible to suppress the occurrence of the shift shock.

Other Embodiments

In the above-described embodiment, the invention is applied to the vehicle equipped with the six-speed (forward) automatic transmission. However, the invention is not limited to this embodiment, but can be applied to the control of the vehicle equipped with a planetary gear-type automatic transmission of which the number of speed ratios is other than six.

In the above-described embodiment, the invention is applied to the control of a four-cylinder gasoline engine. However, the invention is not limited to this embodiment, but can be applied to the control of the vehicle equipped with a multi-cylinder gasoline engine of which the number of cylinders is other than four, such as a six-cylinder gasoline engine. The engine is not limited to gasoline engines. The invention can be applied to the control of the vehicle equipped with another engine, such as a diesel engine.

The invention is not limited to the control of the vehicle equipped with the port injection-type engine, but can be applied to the control of the vehicle equipped with a direct injection-type engine.

What is claimed is:

1. A vehicle controller comprising:
a throttle opening degree control unit that retards decrease in a degree of opening of a throttle when a release of an accelerator is detected during a shift of an automatic transmission; and
a hydraulic pressure control unit that retards decrease in pressure of hydraulic fluid in the automatic transmission in parallel with the retardation of the decrease in the throttle opening degree when the release of the accelerator is detected during the shift,
wherein a first time period during which the throttle opening degree control unit retards decrease in the degree of opening of the throttle overlaps with a second time period during which the hydraulic pressure control unit retards decrease in pressure of hydraulic fluid in the automatic transmission.

2. The controller according to claim 1, wherein,
when the release of the accelerator is detected during the shift of the automatic transmission, the hydraulic pressure control unit causes the hydraulic fluid pressure in the automatic transmission to be gently reduced with a remaining engine torque taken into consideration, the remaining engine torque being caused by the retardation of the decrease in the throttle opening degree.

3. The controller according to claim 2, wherein
the automatic transmission has a planetary gear speed reduction mechanism, and establishes a plurality of gear ratios by engaging or releasing an engaging device into a predetermined state, and,
when the release of the accelerator is detected during the shift of the automatic transmission, the hydraulic pressure control unit causes hydraulic pressure for engagement of the engaging device of the automatic transmission to be gently reduced with a remaining engine torque taken into consideration, the remaining engine torque being caused by the retardation of the decrease in the throttle opening degree.

4. A vehicle control method comprising:
determining whether a release of an accelerator is detected during a shift of an automatic transmission;

retarding decrease in a degree of opening of a throttle when it is determined that the release of the accelerator is detected during the shift; and retarding decrease in pressure of hydraulic fluid in the automatic transmission in parallel with the retardation of the decrease in the throttle opening degree when the release of the accelerator is detected during the shift, wherein a first time period, during which the retarding decrease in the degree of opening of the throttle occurs, overlaps with a second time period, during which the retarding decrease in pressure of hydraulic fluid in the automatic transmission occurs.

5. A vehicle controller comprising:

a throttle opening degree control unit that retards decrease in a degree of opening of a throttle when a release of an accelerator is detected during a shift of an automatic transmission; and a hydraulic pressure control unit that retards decrease in pressure of hydraulic fluid in the automatic transmission in parallel with the retardation of the decrease in the throttle opening degree when the release of the accelerator is detected during the shift, wherein the controller is configured to control the throttle opening degree control unit and the hydraulic pressure control unit such that the throttle opening degree control unit retards decrease in the degree of opening of the throttle at a same time as when the hydraulic pressure control unit retards decrease in pressure of hydraulic fluid in the automatic transmission.

6. A vehicle controller comprising:

a throttle opening degree control unit that retards decrease in a degree of opening of a throttle when a release of an accelerator is detected during a shift of an automatic transmission; and a hydraulic pressure control unit that retards decrease in pressure of hydraulic fluid in the automatic transmission in parallel with the retardation of the decrease in the throttle opening degree when the release of the accelerator is detected during the shift, wherein the throttle opening degree control unit retards decrease in the degree of opening of the throttle when it is first determined that the shift of the automatic transmission is in progress and then it is determined that the release of the accelerator is detected.

7. A vehicle controller comprising:

a throttle opening degree control unit that retards decrease in a degree of opening of a throttle when a release of an accelerator is detected during a shift of an automatic transmission; and a hydraulic pressure control unit that retards decrease in pressure of hydraulic fluid in the automatic transmission in parallel with the retardation of the decrease in the throttle opening degree when the release of the accelerator is detected during the shift, wherein the hydraulic pressure control unit retards decrease in pressure of hydraulic fluid in the automatic transmission when it is first determined that the shift of the automatic transmission is in progress and then it is determined that the release of the accelerator is detected.

8. A vehicle control method comprising:

determining whether a release of an accelerator is detected during a shift of an automatic transmission;

retarding decrease in a degree of opening of a throttle when it is determined that the release of the accelerator is detected during the shift; and retarding decrease in pressure of hydraulic fluid in the automatic transmission in parallel with the retardation of the decrease in the throttle opening degree when the release of the accelerator is detected during the shift, wherein the retarding decrease in the degree of opening of the throttle occurs at a same time as the retarding decrease in pressure of hydraulic fluid in the automatic transmission.

9. A vehicle control method comprising:

determining whether a release of an accelerator is detected during a shift of an automatic transmission;

retarding decrease in a degree of opening of a throttle when it is determined that the release of the accelerator is detected during the shift; and retarding decrease in pressure of hydraulic fluid in the automatic transmission in parallel with the retardation of the decrease in the throttle opening degree when the release of the accelerator is detected during the shift, the method further comprising first determining whether the shift of the automatic transmission is in progress and, if so, then the determining whether the release of the accelerator is detected.

* * * * *